United States Patent
Takano

(10) Patent No.: US 7,345,854 B2
(45) Date of Patent: Mar. 18, 2008

(54) GMR SENSOR HAVING A REFERENCE LAYER WITH MOVABLE MAGNETIZATION

(75) Inventor: Kenichi Takano, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 504 days.

(21) Appl. No.: 10/889,912

(22) Filed: Jul. 13, 2004

(65) Prior Publication Data

US 2006/0012924 A1  Jan. 19, 2006

(51) Int. Cl.
*G11B 5/33* (2006.01)
*G11B 5/127* (2006.01)

(52) U.S. Cl. ............... 360/324.12; 360/324; 360/324.1

(58) Field of Classification Search ......... 360/324–327
See application file for complete search history.

(56) References Cited

U.S. PATENT DOCUMENTS

| | | | |
|---|---|---|---|
| 5,408,377 A * | 4/1995 | Gurney et al. ............... | 360/325 |
| 5,780,176 A * | 7/1998 | Iwasaki et al. ........... | 428/811.2 |
| 6,005,800 A | 12/1999 | Koch et al. ................. | 365/173 |
| 6,117,569 A * | 9/2000 | Lin et al. ................. | 428/811.2 |
| 6,127,053 A | 10/2000 | Lin et al. ..................... | 428/692 |
| 6,262,869 B1 | 7/2001 | Lin et al. ............... | 360/324.11 |
| 6,271,997 B1 * | 8/2001 | Gill ............................. | 360/314 |
| 6,449,134 B1 * | 9/2002 | Beach et al. ........... | 360/324.12 |
| 6,469,878 B1 | 10/2002 | Mack et al. ........... | 360/324.12 |
| 6,473,279 B2 | 10/2002 | Smith et al. ........... | 360/324.12 |
| 6,538,859 B1 * | 3/2003 | Gill ........................ | 360/324.12 |
| 6,608,738 B2 * | 8/2003 | Sakakima et al. ..... | 360/324.11 |
| 6,943,997 B2 * | 9/2005 | Gill ........................ | 360/324.12 |
| 2001/0028537 A1 * | 10/2001 | Gill ............................ | 360/314 |
| 2002/0034056 A1 * | 3/2002 | Chen at al. ............ | 360/324.12 |
| 2002/0041473 A1 * | 4/2002 | Hoshiya et al. ........ | 360/324.11 |

(Continued)

OTHER PUBLICATIONS

"Analysis on Giant Magnetoresistive Characteristics of Synthetic AFM-Based Spin Valves with Modified Pinned Layers," IEEE Trans. on Magnetics; vol. 39, No. 5; Sep. 2003; pp. 2399-2401.*
Analysis on Giant Magnetoresistive Characteristics of Synthetic Antiferromagnet-Based Spin Valves With Modified Pinned Layers, IEEE Trans. on Magnetics, vol. 39, No. 5, Sept. 2003, pp. 2399-2401.

*Primary Examiner*—Andrea Wellington
*Assistant Examiner*—Jason M. Garr
(74) *Attorney, Agent, or Firm*—Saile Ackerman LLC; Stephen B. Ackerman

(57) ABSTRACT

A method for fabricating a spin-valve GMR sensor having a reference layer with a magnetic moment that moves in an opposite direction to that of the free layer in the presence of external magnetic field transitions. The reference layer is a part of a three ferromagnetic layer structure, including pinned, intermediate and reference layers, that when the layers are taken pairwise and separated by spacer layers, includes a strongly exchange coupled synthetic ferrimagnetic pinned and intermediate layer pair and a weakly exchange coupled synthetic ferrimagnetic intermediate and reference layer pair. The reference layer, because of its weak coupling to the intermediate layer, has a magnetic moment that is free to move. During sensor operation, the reference layer and free layer move in opposite directions under the influence of external magnetic field transitions The novel three layer structure provides a sensor of increased sensitivity for a given track width.

6 Claims, 3 Drawing Sheets

*Initial*

*+ transition*

*− transition*

U.S. PATENT DOCUMENTS

| | | | |
|---|---|---|---|
| 2002/0131219 A1 | 9/2002 | Mack et al. | 360/324.12 |
| 2003/0206384 A1* | 11/2003 | Hoshiya et al. | 360/324.12 |
| 2004/0023065 A1 | 2/2004 | Daughton et al. | 428/693 |
| 2005/0002131 A1* | 1/2005 | Gill | 360/324.12 |
| 2005/0052792 A1* | 3/2005 | Gill | 360/324.12 |
| 2006/0221513 A1* | 10/2006 | Carey et al. | 360/324.12 |

* cited by examiner

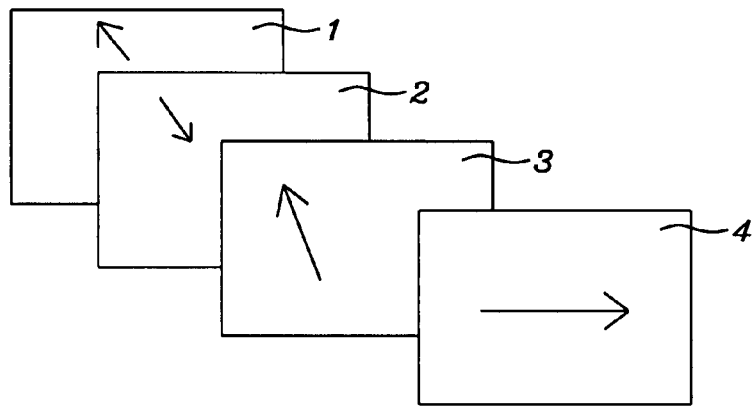
FIG. 1
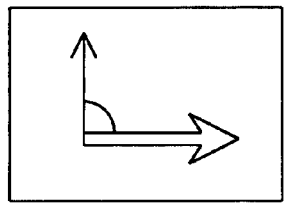
Initial
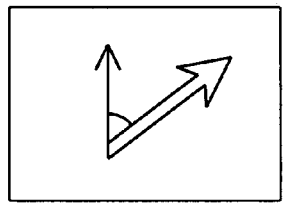
+ transition
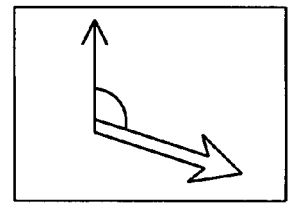
t transition
FIG. 2a
Prior
Art
FIG. 2b
Prior
Art
FIG. 2c
Prior
Art
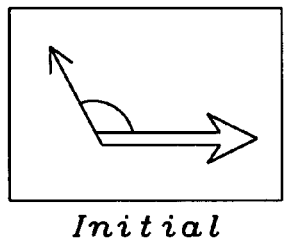
Initial
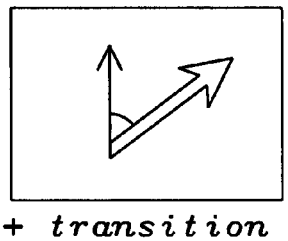
+ transition
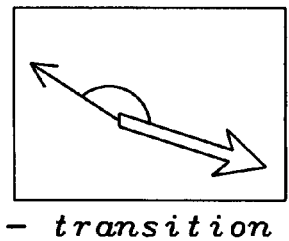
− transition
FIG. 3a    FIG. 3b    FIG. 3c Applied field angle in anneal versus RL angle

*Applied field angle in anneal versus output*

*RL angle versus output*

*Haf versus output*

GMR SENSOR HAVING A REFERENCE LAYER WITH MOVABLE MAGNETIZATION

BACKGROUND OF THE INVENTION

1. Field of the Invention

This invention relates generally to the fabrication of a giant magnetoresistive (GMR) magnetic field sensor for a magnetic read head. More particularly, it relates to such a sensor with a reference (pinned) layer whose magnetization varies in direction.

2. Description of the Related Art

The giant magnetoresistive (GMR) sensor of the "spin-valve" (SV) configuration is a multi-layered configuration of magnetic and non-magnetic layers which includes a magnetically free layer, whose magnetic moment is free to respond to external magnetic stimuli, separated by a non-magnetic layer from a magnetically "pinned" layer, called the reference layer, whose magnetic moment is fixed in direction.

Typically, the magnetic moment of a reference layer is most effectively pinned by forming the reference layer as a laminated three layer structure, called a synthetic ferrimagnet (SyF). The SyF is formed as two layers of ferromagnetic material separated by a non-magnetic spacer layer. The proper choice of spacer layer material, usually Ru or Rh and spacer layer thickness, makes it energetically favorable for the two ferromagnetic layers to couple to each other with oppositely directed, exchange coupled magnetic moments to form the synthetic ferrimagnet, SyF. The SyF is formed on a layer of antiferromagnetic material (AF), called a pinning layer, that unidirectionally pins the magnetic moment of the ferromagnetic layer that it is in contact with. The remaining ferromagnetic layer then maintains its magnetic moment in the opposite direction as a result of the exchange coupling promoted by the spacer layer. We will denote such an antiferromagnetically pinned tri-layered structure of anti-parallel magnetized ferromagnetic layers as AF/AP1/SL1/AP2/SL2/FL. Here. AF denotes the antiferromagnetic pinning layer. The SyF is the combination AP1/SL1/AP2, where Ap1 and AP2 denote the anti-parallel ferromagnetic layers and SL1 is the spacer layer that couples AP1 and AP2. FL denotes the ferromagnetic free layer and SL2 is the second spacer layer, that separates the free layer from the SyF and prevents a strong magnetic coupling between them.

The motion of the free layer magnetic moment relative to the reference layer magnetic moment changes the resistance of the sensor so that a "sense" current passing through the layers produces measurable voltage variations across the sensor. In particular, it is the cosine of the angle between the free and pinned layer magnetizations that determines the sensor resistance and it is the variations of the angle that produce the response of the sensor.

As the size of free layers decrease dramatically, there is a problem of maintaining a stable domain structure that will not be overly affected by temperature variations and produce undesirable signal noise (Barkhausen noise). The random thermal fluctuations of free layer domain structure is associated with small edge domains that do not form closed loops (called uncompensated poles) and are, therefore, energetically easily moved by thermal energy of order kT. The common method of eliminating such edge variations is by means of longitudinal biasing layers, which are permanent (high coercivity) magnetic layers positioned at the lateral edges of the free layer to magnetostatically couple with the edge domains and, in effect, compensate them and make them energetically stable. The biasing layers, however, need not be permanent magnetic layers. Mack et al. (U.S. Pat. No. 6,469,878 B1) teaches a longitudinal biasing method that positions antiferromagnetic exchange tabs formed adjacent to outer edges of the free layer. Other approaches to stabilize the free layer include a method of Smith et al. (U.S. Pat. No. 6,473,279 B2) who teach an in-stack three layer combination that includes an auxiliary free layer proximate to the free layer and separated from the free layer by a non-magnetic spacer layer. A pinning layer is directly exchange coupled to the auxiliary layer and the auxiliary layer is exchange coupled across the spacer layer to the free layer.

Another approach to the problem of free layer biasing is to form the free layer of a superparamagnetic material that requires no biasing at all. Daughton et. Al. (U.S. Patent Application Publication: US 2004/0023065 A1) discloses a thin film based magnetic field sensor of a spin-dependent tunneling type in which the free layer is a thin film of a superparamagnetic substance.

As the informational area density of magnetic media read by such GMR sensors approaches and even exceeds 200 Gb/in$^2$, the ability of such sensors to accurately read increasingly narrow tracks becomes critical. As recorded track widths decrease in width and as linear recorded density increases along the length of the track, the trackwidth and layer thickness of the GMR sensor free layer must both decrease. However, the sensitivity of free layers having such ultra-narrow trackwidths and thicknesses, which is the ability of the free layer magnetic moment to be rotated by the external fields of the recorded media, becomes worse as a result of the free layer edge demagnetization field and the longitudinal bias field from permanent magnets used to maintain a stable free layer domain structure. As noted above, as the free layers become thinner and narrower, the edge pole compensation provided by the longitudinal bias layers actually begins to dominate the magnetic fields of the recorded media and the free layer stability becomes a loss of sensitivity.

One way of improving the response of a GMR sensor that does not address the sensitivity of the free layer involves an improvement of the magnetic properties of the reference layer. In this regard, Lin et al. (U.S. Pat. No. 6,117,569), Lin et al. (U.S. Pat. No. 6,262,869 B1) and Lin et al. (U.S. Pat. No. 6,127,053), teaches, in varying configurations, an improved reference layer wherein a keeper layer formed on the reference layer generates a uniaxial stress-induced anisotropy in the reference layer that substantially increases the exchange pinning field with the antiferromagnetic pinning layer.

The present invention significantly improves the sensitivity of a GMR spin-valve configuration, not by an improved biasing scheme, but by effectively increasing the angle between the free and pinned layer magnetizations for a given external field produced by the magnetic medium. In the traditional spin-valve configuration it is only the magnetization of the free layer that moves in response to external magnetic stimuli. The pinned layer is a "reference" layer in the full sense of the word, it serves only to provide a fixed magnetization relative to which the magnetization of the free layer forms an angle that determines the resistance of the sensor. In the present invention, the magnetization of the reference layer is also allowed to move, so that the angular dependence of the relative magnetizations is enhanced and, along with it, the response of the sensor.

To produce a reference layer with variable magnetization, a novel configuration with three magnetic layers, denoted for now as P1, P2 and P3, separated by non-magnetic spacer layers, and pinned by an antiferromagnetic layer (AF) is required. Certain magnetic properties of a three layer configuration of the form: AF/P1/Ru/P2/Ru/P3 have been studied using calculational models and have been reported in "Analysis on Giant Magnetoresistive Characteristics of Synthetic Antiferromagnet-Based Spin Valves With Modified Pinned Layers" by Jeong-Suk Park, Seong-Rae Lee and Young Keun Kim, IEEE Transactions on Magnetics, Vo. 39, No. 5, September 2003, pp. 2399-2401. Of particular interest in this analysis are the exchange energies between AF-P1, P1-P2 and P2-P3.

The present invention provides a novel variation of the three layered configuration of Park et al. By careful control of the spacer layer material and thickness, the three layered configuration of the present invention allows two of the layers to be strongly coupled (high exchange magnetic field), while the magnetization of the third layer, being the layer adjacent to the free layer, is relatively free to free to move in the presence of the external field of the recorded medium. In this way, the three layer configuration plays a dual role, one pair of its layers providing a stable fixed reference direction, the third layer moving in a way that enhances the GMR effect of the sensor.

SUMMARY OF THE INVENTION

The first object of this invention is to provide a GMR sensor in a spin valve configuration with narrow trackwidth and enhanced sensitivity.

A second object of the present invention is to provide such a sensor in which Barkhausen noise is eliminated or kept within very low limits.

A third object of the present invention is to provide such a sensor in which the response is symmetric with respect to symmetric external field transitions.

A fourth object of the present invention is to provide such a sensor that is free of directional flips of the reference layer magnetic moment.

A fifth object of the present invention is to provide a method of fabricating such a sensor.

These objects will be achieved by the fabrication of a spin-valve GMR sensor in which the usual antiferromagnetically pinned synthetic ferrimagnetic tri-layer, denoted above by the configuration: AF/AP1/SL1/AP2, is replaced by an antiferromagnetically pinned structure that includes three ferromagnetic layers, denoted PL, IL and RL, and spacer layers SL1 and SL2 separating them. Thus, the new structure has the form:

AF/PL/SL1/IL/SL2/RL.

The layer denoted PL, plays the role of a pinned layer, which is unidirectionally pinned by the antiferromagnetic layer. The layer denoted IL, is an intermediate layer, which is strongly exchange coupled to PL across SL1 and has its magnetic moment antiparallel to that of PL. The layer denoted RL, is a reference layer, which is weakly exchange coupled to IL and is therefore relatively free to move, within limits, in response to external fields produced by the recorded media. The term "reference layer" is applied to this layer because it is the cosine of the angle between its magnetization and that of the free layer which determines the GMR effect of the sensor. In fabricating the complete sensor, the three layered structure above is then separated from a free layer, FL, by still another spacer layer to form the spin-valve structure:

AF/PL/SL1/IL/SL2/RL/SL3/FL.

The novel spin-valve sensor formed as above gives to the reference layer, RL, a function not found within prior art spin-valve sensors, namely the function of magnetic moment rotation, in a direction opposite to that of the free layer, in the presence of external magnetic fields. The ability of the magnetic moment of RL to move, while the magnetic moments of PL and IL remain fixed, is given by the choice of the material and thickness of SL2. FIG. 1 is a schematic illustration of the layers: PL (1), IL (2), RL (3) and FL (4), shown displaced for clarity and not including the spacer layers between them. Each layer has an arrow drawn within it, indicating typical magnetic moment directions at some instant of time during sensor operation. It is understood that the magnetic moments in (1) and (2) will remain fixed in space, while the magnetic moments of (4) and, to a lesser extent (3), will move in response to external fields.

Referring next to FIGS. 2a, b and c, there is shown schematically, using thick and thin arrows, the relationship between the magnetic moments of a free layer (thick arrow) and a reference layer (thin arrow) of a prior art spin-valve sensor during magnetic field transitions produced by a moving recorded medium. FIG. 2a shows the approximate 90° angle between free and reference layer magnetic moments in the absence of an external field. FIG. 2b shows what is denoted as a + transition, which decreases the angle between the magnetic moments. FIG. 2c shows what is denoted a − transition, which increases the angle between the magnetic moments. In both transitions, the magnetic moment of the pinned layer (thin arrow) remains fixed in space, while the magnetic moment of the free layer (thick arrow) moves.

Referring next to FIGS. 3a, b and c, there is shown a set of analogous representations of the free (thick arrow) and reference (thin arrow) layer magnetic moments of the present invention. In FIG. 3a, the magnetic moments in the absence of an external field are shown. Note that the angle between the arrows is greater than 90° and less than 270°. This is required in order for the motion of each arrow during a field transition to be in an opposite direction and for the relative motion of the arrows during transitions to always provide a greater angle and, therefore, to provide an enhanced signal response. FIG. 3b shows a + transition, showing the opposite motion of each arrow. FIG. 3c shows a − transition, again showing opposite motion of the magnetic moment.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying figures, wherein:

FIG. 1 is a schematic representation of the PL, IL, RL and FL layers of the present invention, showing typical magnetic moment directions.

FIGS. 2a, b and c are schematic representations of free and reference layer magnetizations of a prior-art spin-valve showing magnetization directions in the absence of an external field (2a) and during + and − field transitions (2b and 2c).

FIGS. 3a, b and c are schematic representations of free and reference layer magnetizations of the present invention spin-valve showing magnetization directions in the absence of an external field (3a) and during + and − field transitions (3b and 3c).

DESCRIPTION OF THE PREFERRED EMBODIMENTS

The present invention provides a modified spin-valve sensor having a synthetic antiferrimagnetic pinned reference layer, which is formed of three ferromagnetic layers, denoted PL, IL and RL (pinned layer, intermediate layer and reference layer) wherein each pair of layers is separated by a spacer layer and magnetized, by exchange coupling, as a synthetic ferrimagnet, SyF. The method of fabricating the sensor is also provided. A novel aspect of the invention is that the exchange coupling between PL and IL is stronger than that between IL and RL, so that the magnetic moment of RL is relatively free to move in the magnetic field of the recorded medium, while the PL/IL combination plays the role of a pinned layer. Because the annealing of the structure creates an angle between the magnetic moments of RL and the free layer, FL, that is between 90° and 270°, the free layer magnetization moves in an opposite direction to the RL magnetization under the influence of the external field. This motion creates a stronger GMR effect for a given field transition than would be created in a prior art spin-valve wherein the magnetization of the reference layer is fixed.

The preferred embodiment to be described below is the result of a series of experiments on a spin-valve stack of the following form, where numerical subscripts refer to approximate preferred thicknesses in angstroms:

$BL_{50}/PtMn_{120}/CoFe_{15}/Ru_8/CoFe_{15}/Ru_x/Cr_y/Cu_z/$
$CoFe_{10}/Cu_{18}/CoFe_{10}/NiFe_{20}/Ru_{10}/Ta_{30}$

Figure 4:
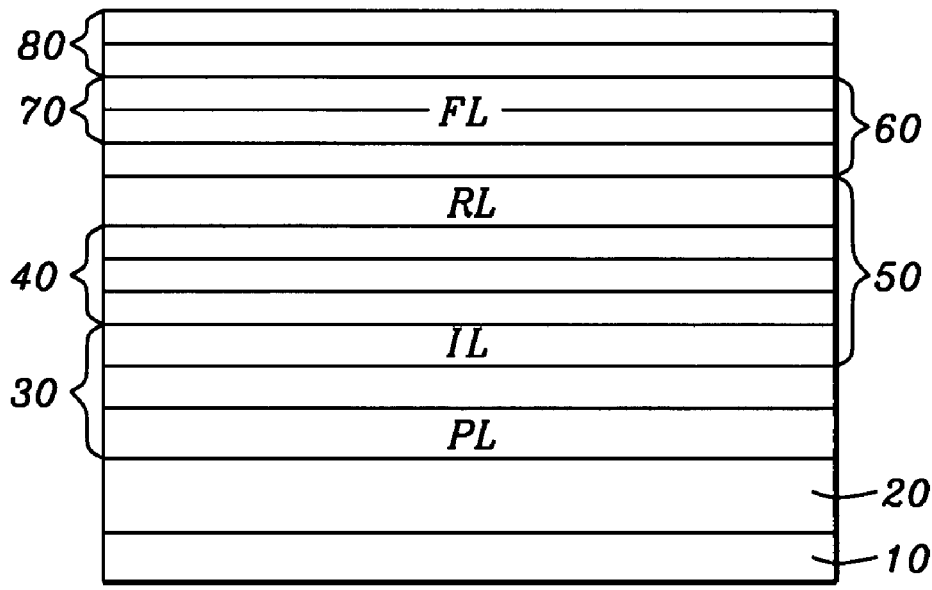
FIG. 4 is a schematic cross-sectional view of a GMR spin-valve stack representing the preferred embodiment of the present invention.

Referring to FIG. 4 there is seen a schematic cross-sectional view of the spin-valve stack described above. The configuration was designed to analyze the effect of a composite three layer spacer, $/Ru_x/Cr_y/Cu_z/$ (40), with individual layer thicknesses, x, y, and, z to be determined so as to produce optimal performance characteristics of the configuration. It is to be understood that when the stack configuration above is fabricated within an operational sensor, it would be formed between an undercoated lower magnetic shield layer and an upper magnetic shield layer and separated from the shield layers by lower and upper insulating gap layers, respectively. The thicknesses of the gap layers can be adjusted to produce a desired shield-to-shield spacing.

The various elements of the stack configuration above are as follows: $BL_{50}$ (10) is a buffer layer between approximately 30 and 60 angstroms in thickness with approximately 50 angstroms being preferred, whose composition is not critical to the experiment. $PtMn_{120}$ (20) is an antiferromagnetic pinning layer between approximately 100 and 150 angstroms in thickness with approximately 120 angstroms being preferred. $CoFe_{15}Ru_8/CoFe_{15}$ (30) is the PL/SL1/IL structure discussed above, with approximate preferred layer thicknesses in angstroms given as subscripts, but where the CoFe PL and IL can be formed between approximately 13 and 25 angstroms in thickness and the Ru SL1 can be formed between approximately 7 and 8 angstroms in thickness with approximately 8 angstroms being preferred $CoFe_{15}/Ru_x/Cr_y/Cu_z/CoFe_{10}$ (50) is the IL/SL2/RL structure discussed above. In the Ru/Cr/Cu SL2 portion of that structure, x is between approximately 3 and 6 angstroms, y is less than 4 angstroms and z is less than 2 angstroms. In an alternative configuration, using only a layer of Ru, the value of x is between approximately 8 and 11 angstroms. The second CoFe layer (the RL) is between approximately 10 angstroms and 25 angstroms in thickness with approximately 10 angstroms being preferred. Two SL2 dimensional combinations were found to give preferred results: [x=9 angstroms, y and z=0 angstroms] and [x=4 angstroms, y=3 angstroms and z=1.5 angstroms].

The structure $Cu_{18}/CoFe_{10}/NiFe_{20}$ (60) is SL3/FL, discussed above, with $CoFe_{10}/NiFe_{20}$ (70) being FL, a composite free layer and $Cu_{18}$ being SL3 the third spacer layer. The SL3 layer can be formed between approximately 16 and 20 angstroms in thickness with approximately 18 angstroms being preferred. The CoFe portion of FL can be formed between approximately 5 and 10 angstroms in thickness with approximately 10 angstroms being preferred and the NiFe portion of the FL can be formed between approximately 10 and 30 angstroms in thickness with approximately 20 angstroms being preferred. Finally, $Ru_{10}/Ta_{30}$ (80) is a capping layer, with the Ru being between approximately 5 and 10 angstroms in thickness with approximately 10 angstroms being preferred and the Ta being between approximately 20 and 40 angstroms in thickness with approximately 30 angstroms being preferred.

The object of the experiment was to determine a relationship between the annealing magnetic field angle and the resulting angle of RL for a track width of approximately 0.12 microns and shield-to-shield thickness of 0.065 microns (which includes an upper and lower gap layer and the total stack thickness between the two shields) and different values of the exchange magnetic field, $H_{af}$, between IL and RL. The $H_{af}$ value is a function of $Ru_x/Cr_y/Cu_z$ thicknesses and it is a determining factor in the optimal performance characteristics of the sensor. In this regard, it is found that other SL2 material single layers and composite layers, such as Cr, Ru, Ru/Cr, Ru/Cu, Ru/Cr/Cu, Ru/Cu/Cr or Ru/O/Ru can also achieve the objects of the invention, if their thicknesses are chosen to satisfy the exchange magnetic field criteria.

Figure 5:
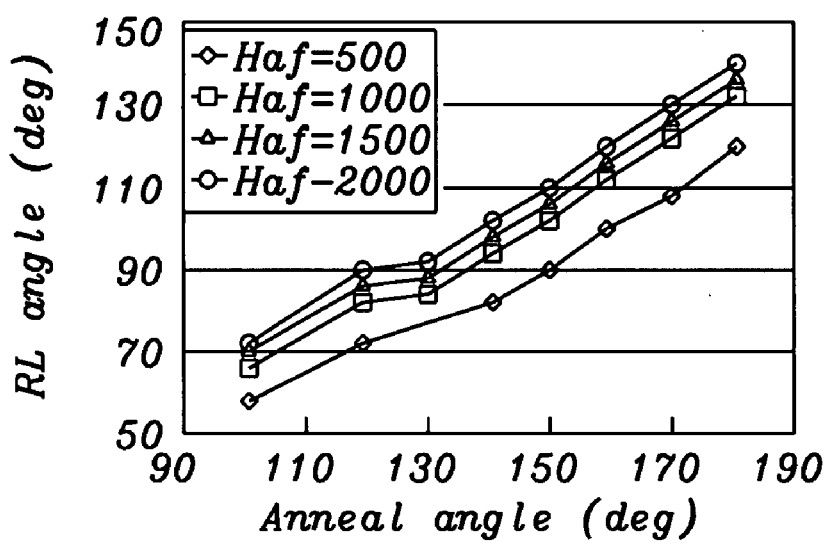
FIG. 5 is a graph of the RL angle as a function of the annealing field angle, for several magnitudes of $H_{af}$, the antiparallel coupling field between IL and RL.

Referring to FIG. 5 there is shown a set of four graphs, each graph corresponding to a different value of $H_{af}$ between 500 and 2000 Oe, and each graph indicating the relationship between the annealing field angle and the resulting RL angle. As has previously been discussed, the RL angle must be between 90° and 270° for the RL magnetic moment and the FL magnetic moment to move in opposite directions under external field transitions. The graph indicates that, in all four cases, the RL angle can be precisely controlled by varying the angle of the annealing field. The annealing process used to magnetize the stack configuration includes two separate steps: (1) a high temperature and high field anneal (270° C.; 10 kOe) to magnetize all stack layers in the direction of the field, typically 90° to the ABS, followed by (2) a low temperature and low field anneal (200° C.; 200 Oe) to fix the magnetic anisotropy of the free layer at approximately 0° to the ABS. It is noted, however, that after subsequent lapping of the ABS, the final effective anisotropy of the free layer is rotated towards 90° by a combination of the stress anisotropy and positive magnetostriction.

Figure 6:
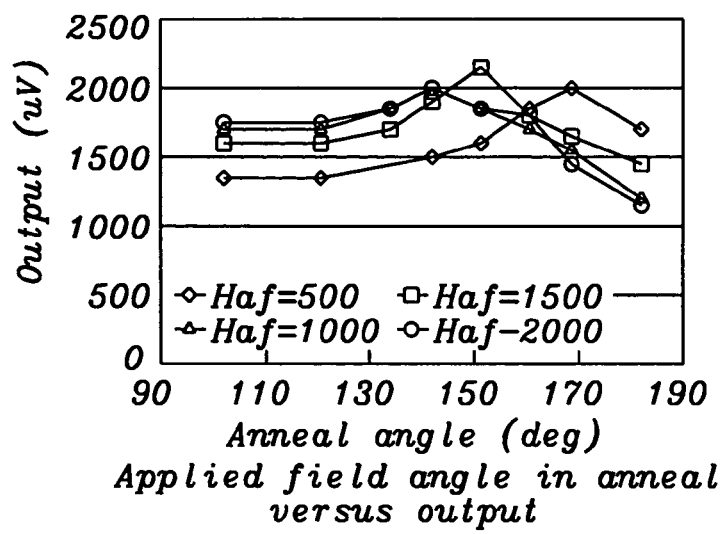
FIG. 6 is a graph of the sensor output as a function of the annealing field angle, for several magnitudes of $H_{af}$, the antiparallel coupling field between IL and RL.

Referring next to FIG. 6, there are shown four graphs, for the same values of $H_{af}$ in FIG. 5, relating the sensor output (in micro-volts) top the anneal angle. Referring back to FIG. 5, it can be seen that an anneal angle of the 10 kOe annealing field between approximately 130° and 170° relative to an air-bearing surface (ABS) plane of the stack will produce the largest sensor output.

Figure 7:
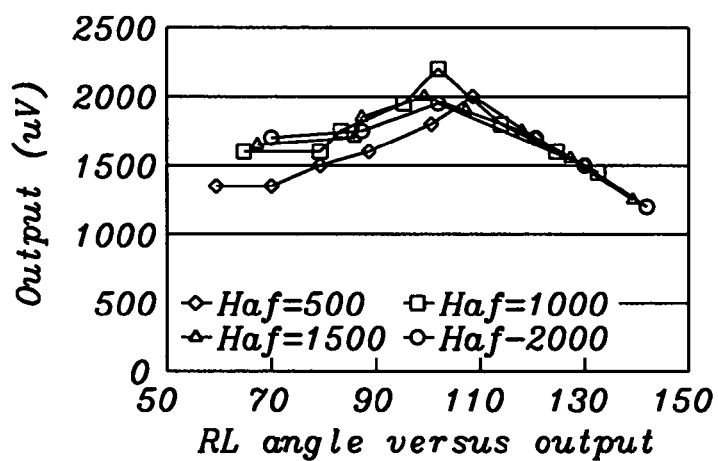
FIG. 7 is a graph of the sensor output as a function of the RL magnetic moment angle, for several magnitudes of $H_{af}$, the antiparallel coupling field between IL and RL.

Referring next to FIG. 7, there are again shown four graphs, each one relating sensor output (in micro-volts) to RL angle. It is seen that an RL angle between approximately 95° and 125° is adequate, with the range between approximately 100° and 110° producing the highest output.

Figure 8:
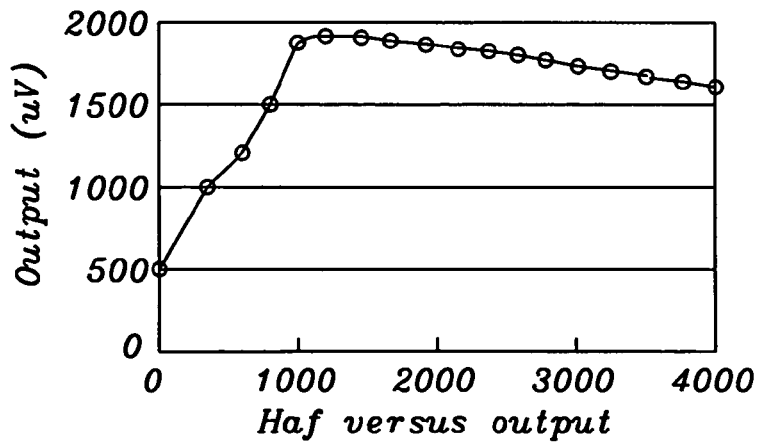
FIG. 8 is a graph of the sensor output as a function of the magnitudes of $H_{af}$, the antiparallel coupling field between IL and RL.

Referring finally to FIG. 8, there is shown a single graph relating $H_{af}$ to output under the conditions of a 140° annealing field angle. The output decreases for $H_{af}$ less than 1000 Oe, and at less than 500 Oe Barkhausen noise is observed. We conclude that a value of $H_{af}$ of at least 1000 Oe and less than 3000 Oe is preferable to achieve the objects of the invention.

As is understood by a person skilled in the art, the preferred embodiment of the present invention is illustrative of the present invention rather than limiting of the present invention. Revisions and modifications may be made to methods, materials, structures and dimensions employed in fabricating a GMR spin-valve sensor with a reference layer having a movable magnetic moment, while still providing a method for fabricating a GMR spin-valve sensor with a reference layer having a movable magnetic moment, in accord with the spirit and scope of the present invention as defined by the appended claims.

What is claimed is:

1. A GMR sensor of the spin-valve type including a reference layer having a magnetic moment that is free to move under the influence of external fields, comprising:
    a substrate;
    an undercoated lower shield formed on the substrate;
    a lower dielectric gap layer formed on the lower shield;
    an antiferromagnetic pinning layer formed on the lower dielectric gap layer;
    a five layer structure formed on said pinning layer, said five layer structure further comprising:
        a pinned ferromagnetic layer, magnetically pinned by said antiferromagnetic pinning layer;
        a first spacer layer formed on said pinned layer;
        an intermediate ferromagnetic layer formed on said first spacer layer and strongly exchange coupled by an exchange coupling field across said first spacer layer to said pinned layer to form a synthetic ferrimagnetic configuration;
        a second spacer layer formed as a composite trilayer of Ru/Cr/Cu on said intermediate layer;
        a ferromagnetic reference layer formed on said second spacer layer and completing said five layer structure, said reference layer being weakly exchange coupled by an exchange coupling field across said second spacer layer to form a synthetic ferrimagnetic configuration, and the magnetic moment of said reference layer being free to move;
    a third spacer layer formed on said reference layer;
    a ferromagnetic free layer formed on said third spacer layer, said free layer having a magnetic moment that is free to move; and, wherein
    the angle between the magnetic moments of said reference layer and said free layer is set initially between approximately 95° and 125° when there is no external magnetic field and wherein the magnetic moments of said reference layer and said free layer thereby move in opposite directions when there is an external magnetic field;
    a capping layer formed on the free layer;
    an upper gap layer formed on the capping layer;
    an upper shield formed on the upper gap layer.

2. The GMR sensor of claim 1 wherein in the second spacer layer the Ru is formed to a thickness between approximately 3 and 6 angstroms, the Cr is formed to a thickness less than approximately 4 angstroms and the Cu is formed to a thickness less than approximately 2 angstroms.

3. The GMR sensor of claim 1 wherein in the second spacer layer the thickness of the Ru is approximately 4 angstroms, the thickness of the Cr is approximately 3 angstroms and the thickness of the Cu is approximately 1.5 angstroms.

4. The GMR sensor of claim 1 wherein the exchange coupling field across said second spacer layer and between the intermediate ferromagnetic layer and the ferromagnetic reference layer is within the range between 500 and 3000 Oe.

5. The GMR sensor of claim 1 wherein the pinned and intermediate ferromagnetic layers are layers of CoFe formed to a thickness between approximately 13 and 25 angstroms.

6. The GMR sensor of claim 1 wherein the ferromagnetic reference layer is a layer of CoFe formed to a thickness between approximately 10 and 25 angstroms.

* * * * *